Figure 4:
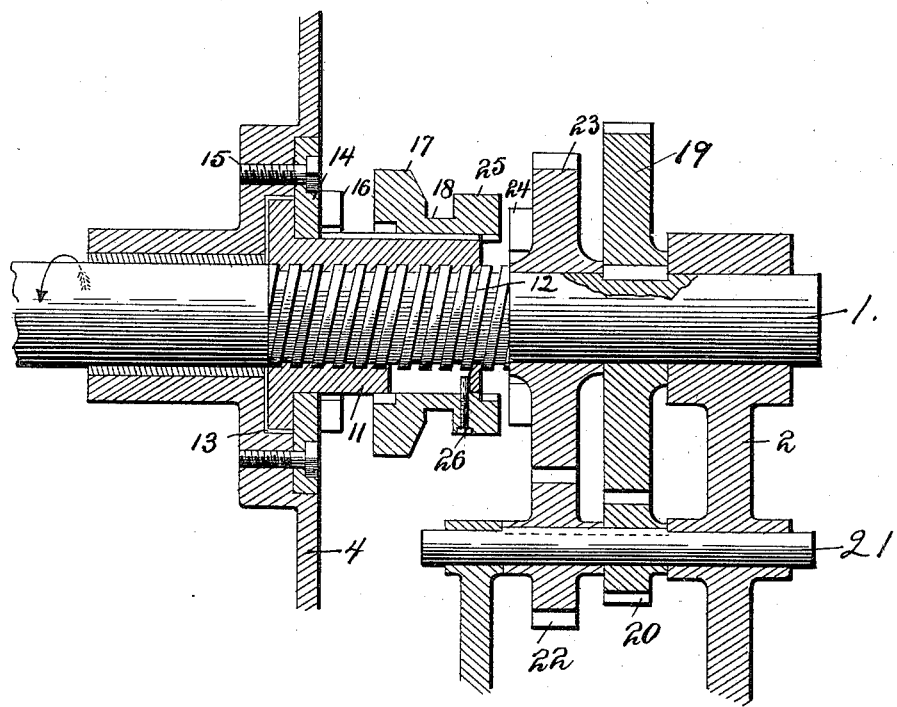

(No Model.) 2 Sheets—Sheet 1.
I. J. SHUMAN.
HOISTING APPARATUS.
No. 585,237. Patented June 29, 1897.
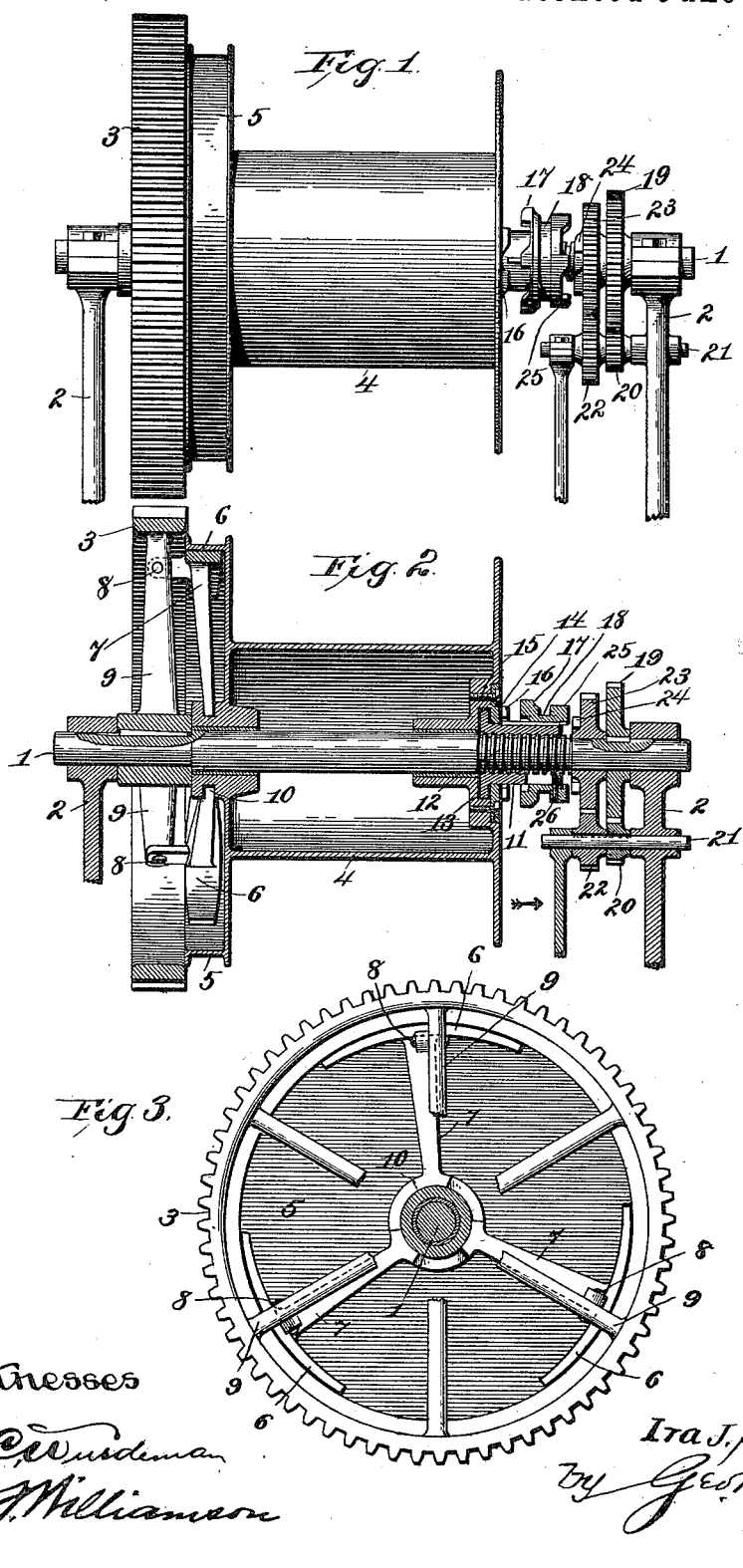
Witnesses
E. C. Wusdeman
J. F. Williamson
Inventor
Ira J. Shuman
by Geo. H. Holgate
Attorney (No Model.)  
2 Sheets—Sheet 2.

I. J. SHUMAN.
HOISTING APPARATUS.

No. 585,237. Patented June 29, 1897.

Witnesses:  
J. B. McGirr.  
R. I. C. Caldwell

Inventor.  
Ira J. Shuman.  
by Geo. H. Holgate  
Attorney.

UNITED STATES PATENT OFFICE.

IRA J. SHUMAN, OF BATH, MAINE.

HOISTING APPARATUS.

SPECIFICATION forming part of Letters Patent No. 585,237, dated June 29, 1897.

Application filed April 17, 1896. Serial No. 588,009. (No model.)

*To all whom it may concern:*

Be it known that I, IRA J. SHUMAN, a citizen of the United States, residing at Bath, in the county of Sagadahoc and State of Maine, have invented certain new and useful Improvements in Hoisting Apparatus, of which the following is a specification.

My invention relates to a new and useful improvement in friction mechanisms for hoisting-drums, and it has for its object to provide devices of this description which when used in connection with a hoisting-drum will enable the operator to cause said drum to revolve with the power-shaft or cease to revolve therewith by but little exertion.

In carrying out this invention I utilize the resistance of the load carried by the drum to bring the friction-surfaces in contact, so that the greater the load the greater will be the friction between said surfaces, and yet when it becomes necessary to remove the friction the operator has only to reverse the clutch, when the full force of the power-shaft will be exerted to bring about this result.

With these ends in view my invention consists in the details of construction and combination of elements hereinafter set forth, and then specifically designated by the claims.

In order that those skilled in the art to which this invention appertains may understand how to make and use the same, I will describe its construction and operation in detail, referring by number to the accompanying drawings, forming a part of this specification, and in which—

Figure 1 is an elevation of a hoisting-drum having my improvements applied thereto; Fig. 2, a longitudinal section thereof; and Fig. 3, an end elevation of the drum and driving-gear, the hub of the latter being broken away and the shaft shown in section. Fig. 4 is an enlarged sectional view of the clutch mechanism.

Referring to the drawings, 1 represents the driving-shaft, journaled in suitable bearings 2, supported by the framework (not shown) and having secured thereto by key or other means the gear-wheel 3, adapted to receive motion from a suitable source of power and cause said shaft to revolve. Mounted upon the shaft 1, so as to revolve freely thereon, is the hoisting-drum 4, having formed upon one of its flanges a friction-ring 5, the interior of which is turned so as to afford a smooth bearing for the friction-shoes 6, which latter are formed or secured to the right-angled levers 7. The short arms of these levers are pivoted at 8 to the spokes 9 of the gear-wheel, and their long arms terminate within the annular groove 10, formed in the hub of the drum, so that when the drum is moved longitudinally upon its shaft in the direction of the arrow the levers will be swung upon their pivots in such manner as to cause the shoes to bind tightly against the inner surface of the ring 5.

11 is a nut of suitable material, whose interior threads are adapted to engage with the threads of the screw 12, formed upon the shaft 1, and is provided with a flange 13, set within a recess formed in the hub of the drum and prevented from being withdrawn therefrom by the plate 14, which plate is secured in position by means of suitable screws 15. This plate is also provided with clutch-teeth 16, adapted to be engaged by the teeth 17 of the clutch 18, which latter is splined upon the nut 11, so as to revolve therewith, but have a limited longitudinal movement thereon. A suitable groove is formed around the clutch for the reception of clutch-shoes of usual construction, by means of which said clutch may be moved longitudinally for the purpose hereinafter set forth. From this it will be seen that when the gear and shaft are revolving and it is desired to cause the drum to revolve therewith to bring about the hoisting in the well-known manner it is only necessary to throw the teeth 17 of the clutch into engagement with the teeth 16 upon the plate, when said clutch will arrest the revolutions of the nut with the shaft, causing the screw upon said shaft to force the nut outward toward the gear 23 and carry with it the drum, and this in turn will cause the levers 7 to swing upon their pivots so as to bring the shoes 6 in contact with the friction-surface of the ring 5, as before described, thus causing the drum to take up the movements of the gear and shaft, but should the load upon the drum be increased sufficiently to retard its movement the nut will be likewise retarded, and as the shaft continues to revolve at the same speed the screw thereon will further force the nut outward, bringing a greater pressure upon the levers, which in turn will force the shoes tighter against the friction-surface of the ring, thereby increasing the friction therebetween until the latter is equal to or greater than the strain exerted by the load upon the drum, when said drum will again move in unison with the shaft.

19 is a gear keyed to the shaft so as to revolve therewith and adapted to mesh with a pinion 20, secured upon a short shaft 21, which latter has also secured upon it a pinion 22, which in turn meshes with the gear 23, loosely mounted upon the shaft, so as to receive no motion therefrom. This last-named gear is provided with teeth 24, adapted to engage with the teeth 25 upon the clutch 18, so that when the last-named teeth are thrown into engagement with the teeth 24 by the proper manipulation of said clutch the latter will be caused to revolve with the gear 23. This arrangement of gears causes the loose gear 23 to revolve faster than the shaft on account of the gear 19 being of greater diameter than the pinion 20, with which it meshes, and also the pinion 22, carried by the same shaft as the pinion 20, being of greater diameter than the latter, as is well understood in gearing.

Now when it is desired to relieve the friction between the constantly-moving parts and the drum the clutch is thrown into engagement with the loose gear, as before described, and as this gear is moving at a higher rate of speed than the shaft, but in the same direction, it will transmit to the nut an accelerated movement which will cause the latter to travel upon the screw in the reverse direction to the arrow and, forcing the drum in the same direction, will swing the levers 7 so as to remove the shoes from contact with the friction-surface of the ring 5, and when this has been accomplished the drum will cease to revolve with the shaft for the purpose well understood in this class of meshes.

It is essential after the drum has ceased revolving to disengage the clutch from the loose gear 23 automatically, and this is brought about by the screw 26 passing through the clutch into engagement with a suitable slot formed in the nut, so that when the nut has moved inward toward the drum sufficiently to cause the end wall of said slot to engage the screw it will carry with it the clutch, thus drawing the latter out of engagement with the teeth 24.

It is obvious that the shoes 6 instead of being formed integrally with the levers 7 may be made separate therefrom and pivoted thereto, and for some reason this is preferable in that the shoes then adapt themselves to the friction-surface of the ring and therefore wear more evenly.

Other slight modifications might be made in the construction here described without departing from the spirit of my invention, and I therefore do not wish to be limited to its exact construction.

Having thus fully described my invention, what I claim as new and useful is—

1. In a device of the character described, a shaft, a drum journaled thereon, a clutch mechanism adapted to be operated by the end movement of the drum, a nut threaded on the shaft, a clutch slidable on the nut and adapted to engage the drum and cause the nut to slide on the shaft and carry the drum therewith, a gear journaled on the shaft and adapted to engage the clutch and back off the nut and drum and means for disengaging the clutch from the gear, as and for the purpose described.

2. In combination with a hoisting apparatus, a drum, a friction-ring carried thereby, a shaft upon which said drum is loosely mounted so as to revolve independent thereof and have a longitudinal sliding movement thereon, a wheel secured to said shaft, levers pivoted to said wheel, the inner ends of which engage a suitable groove formed in the hub of said drum, shoes carried by said levers adapted to engage the friction-surface of said ring, a screw-thread formed upon said shaft, a nut adapted to run upon said threads so connected with the drum as to impart longitudinal movements thereto, but independent of its rotary movement, a clutch splined to said nut having teeth adapted to engage teeth carried by said drum, a gear loosely mounted upon the shaft, provided with teeth to engage teeth on the nut, means for causing said gear to revolve independent of the shaft, said clutch being adapted to be thrown into or out of engagement with either the teeth upon the drum or the teeth upon the gear, substantially as and for the purposes set forth.

3. The herein-described combination of a drum, the shaft upon which said drum is loosely mounted, a ring carried by said drum, a wheel mounted upon said shaft and adapted to transmit motion thereto, levers pivoted to said wheel, shoes carried by said levers adapted to engage the friction-surface of said ring, a hub formed upon the drum having an annular groove therein with which the inner ends of the levers engage, a screw formed upon the shaft, a nut adapted to run upon said screw, said nut being connected with the drum so as to revolve independent thereof and cause said drum to move longitudinally therewith, a clutch splined to said nut, teeth 17 and 25 formed with said clutch, the former adapted to engage with teeth 16 carried by the drum, a gear 23 loosely mounted upon the shaft and having teeth 24 adapted to engage the teeth 25 upon the clutch, a gear 19 rigidly secured to the shaft, pinions 20 and 22 carried upon a short shaft, the former adapted to mesh with the gear 19 and the latter with the gear 23 so as to transmit motion to the last-named gear in the same direction as the shaft but at a greater speed, said clutch adapted to be thrown into or out of engagement with either the drum or the gear 23, substantially as and for the purposes set forth.

4. In a hoist, a drum journaled on a shaft, a clutch mechanism adapted to be operated by the end movement of the drum, a nut threaded on the shaft, to turn therewith, a clutch splined to the nut and adapted to engage the drum and cause the nut to slide on the shaft and carry the drum therewith and means for backing the nut to disconnect the drum from the clutch mechanism as and for the purpose described.

5. In a device of the character described, a drive-shaft, a nut threaded thereon, a drum journaled on the shaft and loosely inclosing a portion of the nut, a clutch splined to the nut and having teeth adapted to engage teeth on the drum, a gear secured on the shaft, a second gear loosely journaled on the shaft having teeth to engage the teeth of the clutch and a shaft carrying two gears engaging the gears on the drive-shaft, substantially as described.

6. In a device of the character described, a shaft, a drum journaled thereon, a clutch mechanism adapted to be operated by the end movement of the drum, a nut threaded on the shaft, a clutch slidable on the nut and adapted to engage the drum and cause the nut to slide on the shaft and carry the drum therewith, a gear journaled on the shaft and adapted to engage the clutch and back off the nut and drum, means for disengaging the clutch from the gear consisting of a pin threaded through the clutch and sliding in a slot of the nut so as to strike the walls of the slot and be carried thereby, as described.

7. In a hoist a drive-shaft, a wheel secured thereto, a drum loosely journaled on the shaft, a friction-ring carried by the drum, a grooved hub on the drum, friction-levers pivoted to the wheel and having their inner ends sliding in the groove of the hub and their outer ends adapted to bear against the friction-ring when the drum is moved away from the wheel, a nut threaded on the shaft and loosely secured to the drum so as to impart longitudinal movement thereto but be free to revolve independent thereof, a clutch splined to the nut having teeth on each end, teeth on the drum to engage the teeth on one end of the clutch, a gear-wheel loosely mounted on the shaft and having teeth to engage the teeth on the other end of the clutch, a gear-wheel rigidly secured on the shaft and pinions carried on a shaft meshing with said gear-wheels and of such relation to each other as to make the loose gear-wheel revolve faster than the shaft and means for disengaging the clutch from the loose gear-wheel consisting of a pin threaded through the clutch and sliding in a slot of the nut so as to strike the walls of the slot in time to be carried with the nut as and for the purpose described.

In testimony whereof I have hereunto affixed my signature in the presence of two subscribing witnesses.

IRA J. SHUMAN.

Witnesses:
FRANCIS W. WEEKS,
JOHN SCOTT.